July 29, 1952 H. C. STORCK 2,605,460

SUPPRESSION SYSTEM

Filed Sept. 20, 1944 2 SHEETS—SHEET 1

INVENTOR.
HOWARD C. STORCK
BY
William D. Hall
ATTORNEY

July 29, 1952 H. C. STORCK 2,605,460
SUPPRESSION SYSTEM
Filed Sept. 20, 1944 2 SHEETS—SHEET 2
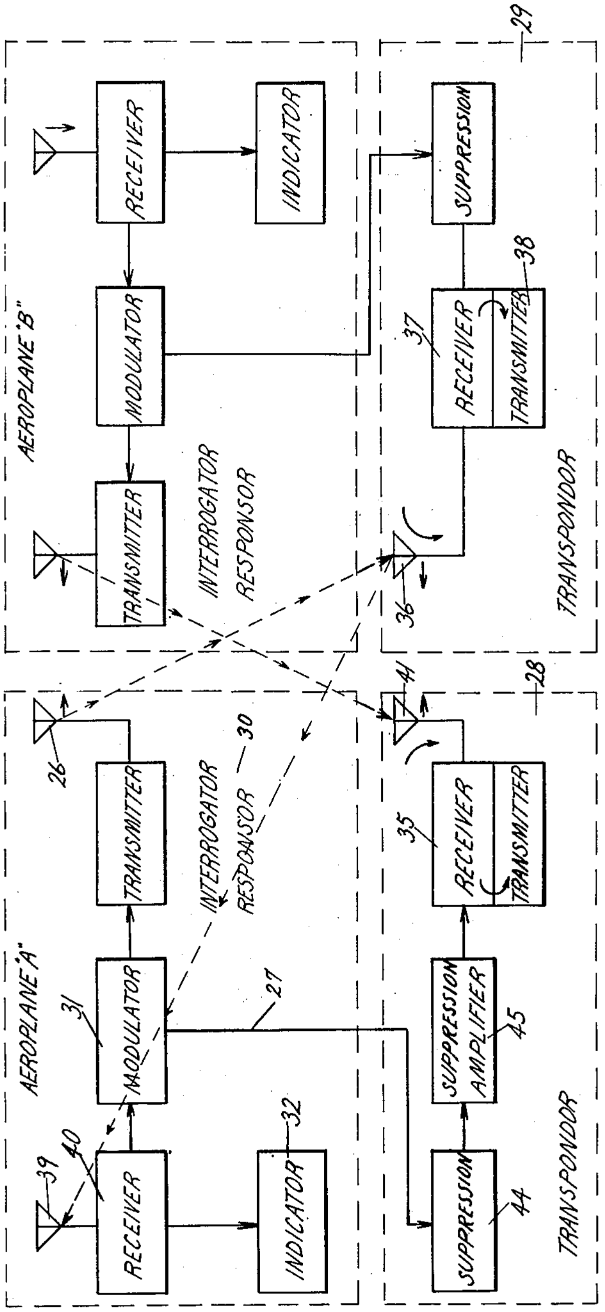
INVENTOR.
HOWARD C. STORCK
BY William D. Hall.
ATTORNEY Patented July 29, 1952

2,605,460

UNITED STATES PATENT OFFICE 2,605,460

SUPPRESSION SYSTEM

Howard C. Storck, Columbus, Ohio

Application September 20, 1944, Serial No. 554,929

2 Claims. (Cl. 343—5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to electronic suppression circuits, having for an object the suppression of a radio receiver over a substantial portion of a received pulse signal cycle.

Another object is to provide for a radio receiver having a cathode ray oscilloscope as an output indicating device, a means for obliterating noise from the cathode ray tube screen during the above stated period.

A further object is to provide means for prolonging the effects of a blanking or similar pulse.

A further object is to provide means for increasing the duration (or width) of the pulse supplied from a high impedance source, and for varying the duration of successive pulses translated therein.

A further object is to provide pulse coupling between circuit networks of different impedance characteristics.

Another object is to provide triggering means in an electronic circuit so that said circuit will trigger from sources of different output impedance values, or of different pulse voltage amplitudes, and which will trigger with pulses of widely different durations.

A further object is to prevent the uncontrollable blocking of a receiver by a transmitted signal by rendering the receiver insensitive at the time of occurrence of the transmitted signal.

A still further object is to variably control the sensitivity recovery time of the receiver so as to not only suppress the transmitted pulse from the screen of the visual display unit of the receiver, but also to suppress subsequent noise or "hash" due to super-regenerative detection radiation.

A still further object in providing this variable receiver-sensitivity control or suppression circuit is to make available a suppression pulse waveform having an exponential form of rise for its leading edge, the purpose of which is to delay the time at which differentiation of the suppression pulse is initiated in the circuit.

These and other objects will appear throughout the specification and will be pointed out in the claims.

The system herein described is particularly adapted for use in interrogator-transponder-responser radio devices popularly referred to as "IFF," or "Identification, Friend or Foe." These devices include a pulsed wave interrogator of a local IFF set, which transmits coded pulse radio frequency waves which, when picked up by a receiver in the transponder portion of a distant IFF set, trigger answering coded pulse waves which are automatically transmitted by a transmitter in the transponder portion of the remote IFF set due to triggering arrangements incorporated. The answering coded pulse waves are received in the responser of the local IFF set.

The receiver in the transponder is of the super-regenerative type and considerable noise or "hash" is developed which, when translated on the screen of the cathode ray tube oscilloscope forming a part of the responser, blurs out the answering signal from the remote transponder to the point of unintelligibility. It is very desirable however to use a superregenerative receiver in the transponder because of its high sensitivity, lack of selectivity, and adaptability to rapid tuning over a wide frequency band.

It is an object of the present invention to provide a blocking signal to the superheterodyne receiver of the local transponder, which starts at the instant of transmission of the local interrogator pulse and lasts only long enough for the answering signals from remote transponders to be received in the local responser. By this means the local transponder does not interfere with the local interrogator-responser but yet is instantly available for response to an interrogation from a remote IFF except during a very brief interval following each transmitted pulse of the local interrogator and embracing the interrogator-responser cycle of operation.

While the circuits and devices are described as being adapted for use in this type of transmitter and receiver, it is to be understood that the use is not limited thereto, but may be extended generally to various electronic receivers and devices.

The suppressor system herein described may be termed a biased type multivibrator which, when actuated by the leading edge of an input triggering pulse, furnishes an output voltage pulse, the duration of which is controllable at will; that is, the output impedance of the multivibrator network serves as the resistance component of a resistance-capacitance integrating circuit. The output voltage of the system is exponential in that the voltage charges the condenser in the input circuit to which it is applied with a constantly increasing amplitude over the period determined by the output of the device. This results in the immediate application of said amplitude rise to the circuit for the time of the exponential rise, which, in effect, postpones the differentiating action until the maximum of the voltage output is reached.

Whereas differentiation of the pulse commonly occurs at the peak voltage with no prolongation of its time factor in present equipments, the present device adds to the differentiation curve of the pulse a much longer time element of duration by adding the exponential rise period.

In the drawings, wherein like numerals denote like parts,

Figures 4, 5, 6:
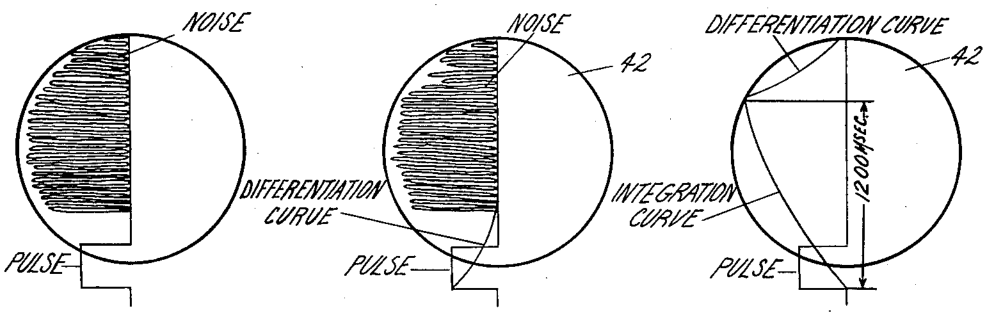

Figure 4 is a schematic-diagrammatic view of the screen of the cathode ray tube oscilloscope of a receiver used in transponder radio equipment; this illustrates an ineffective suppression pulse starting, in time relationship, prior to the initiation of the screen sweep, and the "hash," as it appears after the rectangular pulse, from the hitherto low impedance source, has differentiated to a value which allows premature sensitivity recovery of the receiver.

Figure 5 is a similar view to that of Figure 4, diagrammatically illustrating noise, premature recovery, and the differentiation curve of a non-extended suppressor pulse, showing how the pulse begins to differentiate as soon as its amplitude has reached maximum.

Figure 6 is a similar view of the screen of Figure 5 diagrammatically illustrating integration and differentiation curves of a delayed blanking pulse produced by the invention herein described, and further illustrating the absence of noise indications over the full face of the screen.

Figure 7:
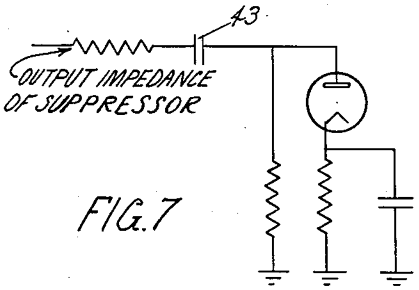
Figure 2:
Figure 2 is a graphic representation of the variable square wave type pulse applied to the circuit of Figure 1, and also the output waveform when not applied to a capacitive circuit.

Figure 7 is a schematic partial diagram of a diode input network of a suppressor amplifier circuit to which the output of the multivibrator may be applied;

Figure 8 is a block plan diagrammatic view of parts of interrogator-transponder-receivers as used in airplanes during "Friend or Foe" interrogation, and illustrating the path of emission of the suppressor pulse and interrogating pulse.

It is to be noted in Figures 4, 5 and 6 that the suppression pulse, exponential rise (or integration) and differentiation curves shown will never appear on the cathode ray tube screen.

*Suppressor operation*

Figure 1:
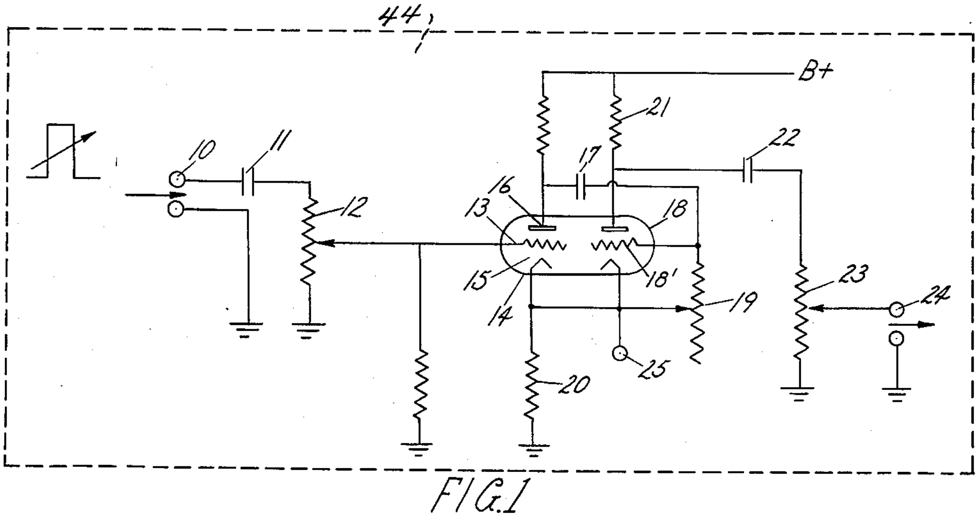
Figure 1 is a schematic view of the novel circuit as applied to the capacitive input of a suppression pulse amplifier circuit.

Referring to the drawings in Figure 1, the input to the suppressor 14 is a positive rectangular pulse through contact 10 and into a capacitor 11 and then through variable resistor 12 which serves as an attenuator for the input pulse. The pulse then is applied to the grid 13 of the left hand triode of the dual triode vacuum tube 14 which forms a multi-vibrator of the self-biased type. For the purpose of describing the triggering action of this multivibrator, let us assume that the left hand triode 15 normally has its plate current cut off due to current resulting from conduction of right hand triode 18. When the triggering pulse arrives on grid 13, plate current is increased due to the conduction caused by the trigger pulse. This lowers the plate voltage on plate 16 and causes the leading edge of the negative pulse from the plate, applied through capacitor 17 to the grid of the right hand triode 18, which is normally in a conducting state, to bias this right hand triode 18 to plate current cut-off condition. This cutting off of conductance of right hand triode 18 leaves capacitor 17 with a negative charge. This charge is continuously applied to the grid 18' of the right hand triode until the voltage on capacitor 17 has been lowered by discharge, through the variable resistor 19 and common cathode resistor 20, to the point where the right hand triode 18 can again assume its conductive state. When triode 18 again assumes its conductive state, plate current flowing through cathode resistor 20 causes triode 15 to again assume its original cut-off condition, wherein it is ready to be again triggered by a successive suppression triggering pulse.

Figure 3:
Figure 3 is a graphic representation of one output waveform obtained from the circuit shown in Figure 1 when loaded.

The new wave form taken from across plate load resistor 21, is a rectangular pulse of variable width. This width is controllable by the adjusted value of resistor 19 and is applied through an attenuator consisting of capacitor 22 and potentiometer 23. The output circuit, therefore, is of high impedance since it is taken from the plate circuit and, when applied to a capacitive input circuit, will charge the capacity of the input circuit, the voltage rise being exponential in form and diagrammatically indicated at Figure 3. There has thus been obtained from a source of high impedance a variable width pulse voltage at terminal 24 from a low impedance voltage source which feeds terminal 10, the width or duration of the pulse being controlled by manipulation of the resistance in variable resistor 19, and the capacitance value of capacitor 17. If the output of the circuit is taken from the cathode circuit 25 instead of the plate output 24, the pulse is of variable width and of low impedance. In effect, the multivibrator circuit described may thereby serve as an impedance matching device.

In order to describe the operation of the suppressor, a complete dual system is illustrated in Figure 8 as applied to two airplanes "A" and "B." As airplane "A" interrogates airplane "B," a pulse, starting in time prior to the start of the final interrogation output pulse of the interrogation-responser installation on airplane "A," is generated in the interrogator-responser modulator system of airplane "A." The interrogating pulse is propagated from antenna 26 of airplane "A." The pulse generated for suppression purposes is fed through feed line 27 to the transponder installation 28 in airplane "A" which is causing the super-regenerative "hash" radiation, thus preventing recognition of the coded IFF signal which will be sent out from the transponder 29 of airplane "B" in response to the above interrogation.

Formerly, the sensitivity of the transponder receiver had been suppressed only as shown in Figures 4 and 5, by a rectangular, steep-sided pulse from the low output impedance source of a suppressor pulse signal available at the interrogator-responser. This, because of the low impedance of the output and the capacitive nature of the input circuit of the suppression amplifier circuit of the transponder, caused initiation of differentiation to ensue as soon as suppressor pulse voltage had reached its peak, which was immediately, and which had started prior to initiation of the transmitter pulse from the interrogator-responder modulator and the sweep circuit for the indicator. This same system is still used in the interrogator-responser but instead of applying the suppressor pulse from the interrogator-responder directly to a suppressor-amplifier, it is applied as a trigger pulse to the multivibrator in the suppressor 44, the output of 44 being fed to the amplifier 45 and receiver portion 35 of transponder 28. The suppressor pulse is first used to trigger the multivibrator circuit and the output of the multivibrator is applied to the suppression amplifier circuit 45 in the transponder 28, and immediately begins to depress the sensitivity of the transponder receiver section 35. This eliminates the super-regenerative "hash" from the interrogator-responser indicating unit 32 since the interrogator-responser receiver 35 in the transponder 28 cannot function while suppressed. Meanwhile, interrogating pulse energy from antenna 26 of airplane "A" reaches the transponder antenna 36 on airplane "B," is detected by its receiver 37 and triggers off transponder transmitter 38 of airplane "B" in some special IFF code. This IFF signal is propagated from the same transponder antenna 36 and is received at the interrogator-responser antenna 39 of "A's" receiver 40 where it is detected and finally applied to oscilloscope indicator 32. Thus "A's" receiver 35 is suppressed while its other receiver 40 is receiving the desired signal from the transmitter of "B's" transponder 38.

From the description of the circuit, it is to be noted that the capacitor 17 serves to store pulse voltage and that by varying the value of resistance presented by potentiometer 19, the retention of this stored voltage may be prolonged or shortened at will, thus delaying or hastening the ensuing resumption of the original or quiescent state of the multivibrator which completes the cycle and forms the trailing edge of the output pulse of the subject device. This delay, occasioned by capacitor 17 and potentiometer 19, results in extending the width or duration of the output pulse from the multivibrator.

When the pulse from the plate outlet 24 is impressed on the input of the transponder suppression amplifier circuit (Figure 7), the transponder receiver 35, which receives the output of the suppression circuit 45, as well as the interrogation signal of airplane "B" intercepted by its antenna 41, is cut off; that is, its sensitivity is depressed for not only the period of differentiation of the voltage on capacitor 43 of Figure 7, but also during the period of its charging, as selected by potentiometer 19 of Figure 1.

This duration of charging and discharging of condenser 17 is made long enough to effectively obliterate from the screen 42 of oscilloscope 32 not only the initial transmitted pulse, but also ensuing "hash," so that the automatically triggered answering IFF signals from the transponder 29 in airplane "B" may be observed. By properly setting potentiometer 19, the suppressor pulse may suppress the receiver for 1200 microseconds, as shown in Figure 6, or more, instead of the heretofore 200 microseconds. As the interrogator-responser cycle of operation is well within 1200 microseconds it is seen that means have been provided for suppressing the transponder during this cycle and for restoring the transponder to operative condition immediately upon completion of the cycle.

It may be seen that, but utilizing an exponential rise as supplied to the suppression amplifier circuit, initiation of differentiation is delayed because condenser 43 cannot start to discharge as long as the voltage has not risen to maximum and also that the receiver is suppressed during the exponential time of rise plus the small portion available during time of differentiation, as shown in Figure 6.

From the description of the circuit, it is to be further noted that the capacitor 17 serves to delay integration or storage of the pulse voltage during the alternate triggering actions of the triodes, and that the resistance of potentiometer 19 may be varied to increase or decrease the discharging rate at will. When the pulse from the plate outlet 24 is impressed on the suppression amplifier input circuit of a receiver, such as an IFF transponder system, the receiver is cut off during not only the period of differentiation or discharge of condenser 43, but also during its period of integration or charging. This extra pulse duration which is the sum of charging and discharging time effectively obliterates from the screen not only the transmitted pulse, but also the ensuing "hash" so that no noise or "hash" indications are visible thereon. If only the differentiation or discharge time were used, all of the "hash" could not be so obliterated, but only a small portion due to voltage of the differentiation curve, as shown in Figure 5. By the use of the pulse extender herein described, it has been found possible to extend the noise blanking period clear off the screen, whereas heretofore the most that could be attained was about 10 per cent blanking.

In actual practice the input circuit to suppressor amplifier 45 is as shown in Fig. 7, there being a small capacitor 43 in series in the input. In order therefore to pass the long blanking signal from suppressor 44 it is necessary to make the output impedance of suppressor 44 a high resistance.

The invention has been described in its preferred embodiment and it is contemplated that changes may be made in the details and applications thereof within the spirit and scope of the appended claims.

Having thus described the invention, what is claimed is:

1. An electrical circuit for blanking a receiver, including: a source of blanking pulses; a blanking amplifier having a capacitative input circuit and an output circuit coupled to said receiver to apply a blanking voltage thereto; a self-biased multivibrator triggered by said blanking pulses, the output of said multivibrator being applied to the input capacitative circuit of said blanking amplifier, said multivibrator being adapted to produce output pulses each having a greater time duration than each of said blanking pulses; and means for shaping said output pulses of said multivibrator so that their leading edges gradually rise in an exponential manner.

2. In combination, an interrogator-responser including a modulator; a transponder including a receiver; and an electrical circuit triggered by blanking pulses derived from said modulator, for blanking said receiver, said circuit comprising: a blanking amplifier having a capacitative input circuit and an output circuit coupled to said receiver to apply a blanking voltage thereto; a self-biased multivibrator triggered by said blanking pulses, the output of said multivibrator being applied to the input circuit of said blanking amplifier, said multivibrator being adapted to produce output pulses each having a greater time duration than each of said blanking pulses; and means for shaping said output pulses of said multivibrator so that their leading edges gradually rise in an exponential manner.

HOWARD C. STORCK.

REFERENCES CITED

The following references are of record in the file of this patent:

UNITED STATES PATENTS

| Number | Name | Date |
|---|---|---|
| 2,132,599 | Baumann | Oct. 11, 1938 |
| 2,252,083 | Luck | Aug. 12, 1941 |
| 2,262,838 | Deloraine et al. | Nov. 18, 1941 |
| 2,321,698 | Nolde | June 15, 1943 |
| 2,324,314 | Michel | July 13, 1943 |
| 2,371,988 | Granqvist | Mar. 20, 1945 |
| 2,373,145 | Sensiper et al. | Apr. 10, 1945 |
| 2,416,328 | Labin | Feb. 25, 1947 |
| 2,540,087 | Barchok et al. | Feb. 6, 1951 |

FOREIGN PATENTS

| Number | Country | Date |
|---|---|---|
| 113,233 | Australia | June 2, 1941 |

OTHER REFERENCES

Review of Scientific Instruments, December, 1936 pp. 450–453.